Patented July 7, 1931

1,813,364

UNITED STATES PATENT OFFICE

SAMUEL LEWIS SUMMERS, OF FORT WASHINGTON, PENNSYLVANIA

CONDENSATION PRODUCT OF THE DIETHYL ESTER OF METHELENE-DISALICYLIC ACID-DI(P-AMINO BENZYL ETHER) WITH PYRUVIC ACID

No Drawing.    Application filed October 30, 1924.    Serial No. 746,868.

This invention relates to synthetic organic chemical compounds used in pharmacy and it has for an object to provide an effective remedy for the treatment of uric acid disorders and the various ailments developed by the presence of such acid in the human system.

With the foregoing object in view my invention consists of a novel process and new composition of matter characterized by high therapeutic properties, and hence is destined as a pharmaceutical preparation for the effective treatment of uric acid diathesis, rheumatism, anthritis, gallstone, glycosuria and kindred disorders.

In carrying out the invention, and as a concrete example, I unite two salicylic acid molecules in a condensing reaction. By the reaction thereon of formaldehyde, one hydrogen atom in each of the salicylic acid groups is removed while the formaldehyde is deprived of its oxygen thus leaving the methylene group $CH_2$. The reaction and its product may be represented as follows:

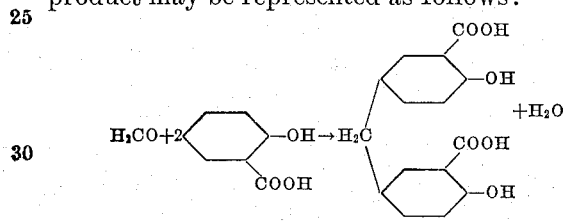

Two hundred and eighty-eight pounds of this compound are converted into its sodium salt and heated to 150° C. with three hundred and forty-three pounds of paranitrobenzyl chloride—or either of the two isomers of this nitrobenzyl compound. The reaction and its product may be represented as follows:

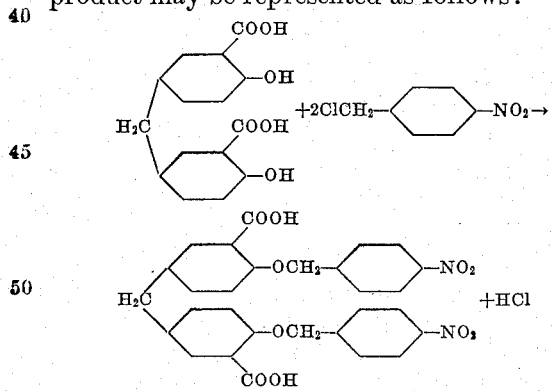

The product of this reaction is heated in three hundred gallons of clean water to which sufficient caustic soda is added to give an alkaline reaction, when three hundred and fifty pounds (350 lbs.) of sodium hydrosulphite is gradually added with the temperature of the mass maintained at 80° C. for eight hours. The organic compound resulting is precipitated out of the solution by means of muriatic acid in sufficient amount to turn congo test paper blue. The reaction and its product may be represented as follows:

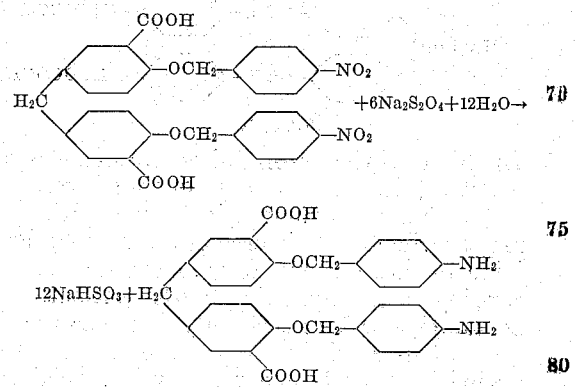

The product of the reaction is mixed with one hundred and forty pounds (140 lbs.) of ethyl alcohol at a temperature below 70° C., and one hundred pounds (100 lbs.) of sixty-six degree sulphuric acid is gradually added so that the temperature does not advance beyond the aforesaid degree (70° C.). After all the sulphuric acid is added, the temperature is slowly raised during eight hours to 110° C. The reaction and its product may be represented as follows:

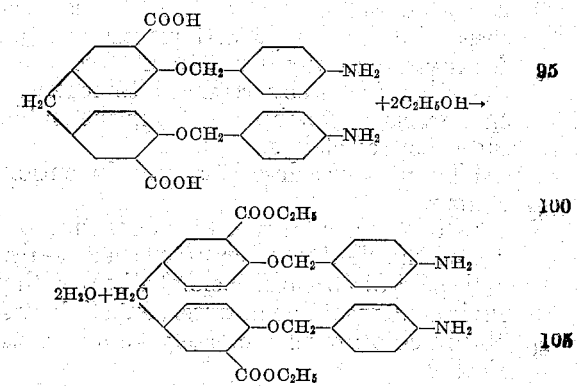

The resultant reaction product is washed in clean water and heated to 120° C. for two hours with one hundred and seventy-six pounds (176 lbs.) of pyruvic acid, after which the condensation product of the diethyl ester of methylene-disalicylic acid-di (p-amino benzyl ether) with pyruvic acid, or methylene m m' diethylsalicylate-p p' di (p-pyruvyl-amino-benzyl ether) is thoroughly pulverized. This product—$C_{39}H_{42}N_2O_{10}$—is an amorphous powder, brown in color, insoluble is water, slightly soluble in chloroform and freely soluble in ethyl alcohol. The reaction and its product may be represented as follows:

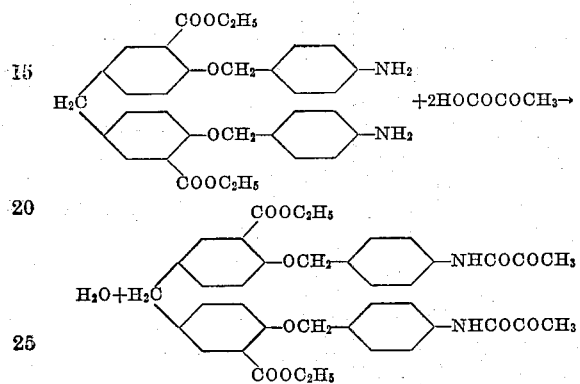

In this case the empirical composition is, of course, different from that given above.

This new pharmaceutical composition of matter when administered as an internal medicine in doses of ten to fourteen grains, according to the condition of the patient, will be found a valuable remedy and curative in cases of uric acid diathesis, rheumatism and anthritis; as well as extremely beneficial for the elimination of gallstones and glycosuria.

Although I have given certain quantities and proportions for the various ingredients in the preparation of my new composition of matter, it is to be distinctly understood that the same are by way of a concrete example only, as they may be varied to react a predetermined quantity without departing from the scope of this invention. Likewise the time periods hereinbefore stated as involved in the several stages of the process are not to be considered arbitrary, they likewise, being susceptible of change without materially affecting the resultant reaction. Accordingly the right is hereby reserved to make such changes as reasonably lie within the ambit of the appended claims.

Having thus described my invention I claim:—

1. The hereindescribed condensation product of the diethyl ester of methelene-disalicylic acid-di (p-amino benzyl ether) with pyruvic acid, insoluble in water, but slightly soluble in chloroform and freely soluble in ethyl alcohol.

2. The process of producing the hereindescribed organic product which comprises condensing two molecules of salicylic acid with formaldehyde, forming the sodium salt of the resultant condensation product and condensing the same with paranitrobenzyl chloride, reducing this condensation product, esterifying the reduction product, and condensing the esterification product with pyruvic acid.

3. A process of producing the hereindescribed organic product which comprises heating the sodium salt of methylene-disalicylic acid with paranitrobenzyl chloride, heating the resultant product in alkaline solution with sodium hydrosulphite, treating the resultant product with ethyl alcohol in the presence of sulphuric acid, and heating the product of this reaction with pyruvic acid.

In testimony whereof, I have hereunto signed my name at Philadelphia, Pennsylvania, this 3rd day of October, 1924.

SAMUEL LEWIS SUMMERS.